United States Patent [19]
Bauman et al.

[11] Patent Number: 5,693,714
[45] Date of Patent: Dec. 2, 1997

[54] HIGHER MODULUS COMPOSITIONS INCORPORATING PARTICULATE RUBBER

[75] Inventors: Bernard D. Bauman, Emmaus; Mark A. Williams, Souderton; Reza Bagheri, Bethlehem, all of Pa.

[73] Assignee: Composite Particles, Inc., Allentown, Pa.

[21] Appl. No.: 609,520

[22] Filed: Mar. 1, 1996

Related U.S. Application Data

[63] Continuation-in-part of Ser. No. 344,097, Nov. 23, 1994, Pat. No. 5,506,283, which is a continuation-in-part of Ser. No. 129,227, Sep. 29, 1993, Pat. No. 5,382,635, which is a continuation-in-part of Ser. No. 842,815, Feb. 27, 1992, abandoned.

[51] Int. Cl.$^6$ ............................................................. C08F 8/00
[52] U.S. Cl. ........................... 525/104; 521/54; 525/129; 525/169; 525/184; 525/222; 525/232
[58] Field of Search ............................ 525/104, 129, 525/169, 184, 222, 232; 521/54

[56] References Cited

U.S. PATENT DOCUMENTS

| | | | |
|---|---|---|---|
| 3,553,857 | 1/1971 | Pettit et al. | 36/32 |
| 4,501,859 | 2/1985 | Newman et al. | 525/356 |
| 4,710,538 | 12/1987 | Jorgenson | 525/53 |
| 4,771,110 | 9/1988 | Bauman et al. | 525/131 |
| 4,992,513 | 2/1991 | Bauer et al. | 525/184 |
| 4,996,262 | 2/1991 | Pyke et al. | 525/177 |

FOREIGN PATENT DOCUMENTS

| | | |
|---|---|---|
| 433313 | 8/1935 | United Kingdom. |
| 2025321 | 1/1980 | United Kingdom. |

OTHER PUBLICATIONS

J. Harper Teruet, et al, "Chlorinolysis Reclaims Rubber of Waste Tires", NASA Tech Brief, vol. 5, No. 3, Item 55 (Jan. 1981).

K. Kinoshita, "Treatment of Rubber Vulcanizate with Chlorine, Gas or Hydrogen Chloride Gas", Chem Abstracts, vol. 78, No. 14 (1972) Columbus.

*Primary Examiner*—Bernard Lipman
*Attorney, Agent, or Firm*—Sanford J. Piltch

[57] ABSTRACT

Rubber particles, to be used as fillers or extenders for various composite polymer systems, are chlorinated by a gas-solid phase reaction with a chlorine-containing gas. A composite polymer containing the chlorinated rubber fillers or extenders exhibits a higher flexural modulus than if prepared using an unchlorinated rubber filler or extender. Chlorination of the rubber particles is carried out by contacting the finely divided rubber particles with a chlorine-containing gas comprising at least about 5 volume percent chlorine. Advantageously, the chlorine can be diluted with air, nitrogen or other essentially inert gases and may contain minor amounts of fluorine. Improved performance is obtained with nitrogen dilution of the chlorine gas over air dilution. Improved polymer composite systems having higher flexural modulus result from the use of the chlorinated rubber particles as fillers instead of unchlorinated rubber particles.

25 Claims, 2 Drawing Sheets

HIGHER MODULUS COMPOSITIONS INCORPORATING PARTICULATE RUBBER

CROSS-REFERENCE TO RELATED APPLICATION

This application is a continuation-in-part of U.S. patent application Ser. No. 08/344,097, filed Nov. 23, 1994, now U.S. Pat. No. 5,506,283 which is a continuation-in-part of U.S. patent application Ser. No. 08/129,227, filed Sep. 29, 1993, now U.S. Pat. No. 5,382,685, which is a continuation of U.S. patent application Ser. No. 07/842,815, filed Feb. 27, 1992 now abandoned.

The Government of the United States of America has rights in this invention pursuant to Contract Nos. DE-AC07-88ID12695 and DE-FC02-93CE41037 awarded by the U.S. Department of Energy.

FIELD OF THE INVENTION

This invention relates to a method for treating vulcanized crumb rubber to be used as a filler or extender in other polymeric resin systems to improve the stiffness, or modulus, of the rubber material to improve the overall modulus of the resulting polymeric resin system incorporating the rubber filler. One source of such crumb rubber is the recycling of used automotive tires.

Various efforts have explored means to improve the recovery or usefulness of rubber reclaimed from automotive tires or other applications. Many of these processes are directed to the devulcanization of the rubber, such as the solvent chlorinolysis process described in a publication on "Chlorinolysis Reclaims Rubber of Waste Tires", J. H. Tervet, G. G. Hull and E. R. DuFresne in NASA Tech Brief, Vol. 5, No. 3, Item 55 (January 1981).

In general, use of reclaimed or other crumb rubber is limited by the low stiffness or modulus of the rubber. In the tire industry, reclaimed rubber is the term often used to describe devulcanized rubber, i.e. rubber that has been heated and sheared in the presence of chemicals to break the sulfur bonds. Additional uses can be realized and improved polymer systems benefiting from the inclusion of elastomeric rubber fillers or extenders if the rubber stiffness, or modulus, could be increased. Such high modulus rubber could be used in polyurethane and polyester systems. With fillers of the present invention, rubber reclaimed from used tires may effectively and economically be used as fillers and extenders in substitution for high cost polymers while at the same time effecting the environmentally friendly recycling of the used tires. Other means of producing high modulus rubbers have been described in U.S. Pat. Nos. 4,992,513 and 4,996,262 for producing rubbers having a high modulus by grafting either nylon or polyester onto the rubber. Other methods have used halogenation of the surfaces of rubbers to improve surface adhesion to other polymers. Examples of such treatments are described in U.S. Pat. No. 4,771,110 (use of fluorine) and U.S. Pat. 3,553,857 (surface halogenation with bromine or chlorine to improve adhesion).

SUMMARY OF THE INVENTION

This invention provides a relatively easy and inexpensive means for substantially increasing the stiffness, as measured by the Young's modulus, of the bulk of a ground or crumb vulcanized rubber by a gas-solid phase treatment of the rubber with chlorine gas, preferably in a chlorine/air or, even more preferably, in a chlorine/nitrogen mixture. No special pre-treatment of the rubber is required. The reaction of the rubber with the chlorine gas mixture can be carried out in any suitable reactor. Since solvents are not used, the expense of solvent handling, recovery and drying are avoided.

This invention is carried out by treating the crumb rubber, which can be in a crumb, pulverized or finely ground (powder) state, with a chlorine-containing gas. The treatment is carried out in a reactor in which the particlized rubber is contacted with the chlorine-containing gas at a temperature from about 32° F. (0° C.) to about 200° F. (93.3° C.), with the reaction pressure being preferably within the range of from about 1 atm to about 10 arm. The chlorine-containing gas will generally comprise from about 5% chlorine by volume to substantially pure chlorine. Preferably the chlorine concentration is in the range of from about 8% to about 50% by volume although such concentrations are not deemed critical. Since the diffusion and reaction rate of the chlorine within the rubber particles is a function of the concentration and pressure of the chlorine, the more encompassing definition of preferable chlorine concentrations for treating the rubber would be the partial pressure of the chlorine. Measured in this manner, the partial pressure of the chlorine should preferably be within the range of from about 0.05 atmospheres absolute (corresponding to a 5% concentration of chlorine in a system at atmospheric pressure) to about 0.5 arm. absolute. The other components, referred to as diluents, of the chlorine-containing gas may comprise air or inert gases such as nitrogen. Preferably the diluent comprises substantially nitrogen. The contact time will depend upon the size of the rubber particles, since the gas must diffuse into the bulk of the particles, and also upon the reaction gas chlorine concentration, temperature and pressure, but is generally in the range of from about 20 seconds to about 60 minutes. Certain reaction conditions, such as higher temperature, pressure or chlorine partial pressure, could result in shorter required exposure times for desired modulus increases. The chlorine-containing gas may be used in either a batch reaction mode with an initial charge of gas containing sufficient chlorine for treatment or may be added continuously throughout the reaction. Contact between the chlorine-containing gas and the rubber particles is best achieved by tumbling the rubber particles within the reactor or by using the chlorine-containing gas to fluidize the rubber particles. In other embodiments, both the chlorine-containing gas and rubber particles may be continuously added to and taken from the reactor. After a suitable reaction time, the treated rubber is separated from the chlorine-containing gas and purged, if necessary, of unreacted chlorine-containing gas by a suitable purge gas, preferably either an air or nitrogen purge.

In addition to the chlorine gas component, it has been found advantageous for the treatment gas to contain a minor amount of fluorine gas. While not necessary to the effective treatment of the rubber using chlorine, the presence of from about 1 to 2 percent by volume of fluorine in the chlorine-containing gas accelerates the treatment process.

The chlorine treated rubber may then be used as a filler or extender in other polymer systems, such as polyurethanes, polyesters, epoxies, nyrim (reaction injection molded nylon), silicone-based polymers, polycarbonates, phenolics, acrylics, polysulfide and other systems requiring a rubber filler of high modulus.

This invention encompasses the chlorine-treated rubber filler materials having a high modulus, the method for making such high-modulus rubber fillers, and composite polymer systems incorporating the high modulus, chlorine-treated rubber fillers and extenders.

DETAILED DESCRIPTION OF THE INVENTION

This invention provides for the modification of rubber materials used as fillers or extenders for other polymer materials to increase the stiffness, measured by the Young's modulus, of the polymer and treated rubber composite material. Young's modulus is defined as a material's resistance to deformation, or stiffness, and is specifically defined as the initial rate of deformation to strain measured by taking the slope of the stress-strain curve in the region of a very small strain. Young's modulus may be measured in accordance with ASTM Method D-638. This increase in the modulus of the composite polymer and treated rubber material makes the treated rubber material suitable for additional use as a filler or extender in composite polymer materials without excessive decrease in the modulus of the composite polymer which would be normally incident to the use of untreated rubber of the type obtained from automotive tires. In fact, with highly chlorinated rubber particles, the composite may have flexural moduli higher than the host polymer.

Such composite polymers would have substantial uses at considerable cost and energy savings. The treated rubber extended made by chlorinating reclaimed tire rubber particlized material would cost less than about one half to one fourth of the cost of the host polymers. Since it may be substituted in the polymer as an extender or filler at rations of up to 70% or even higher, depending upon application and polymer system, while maintaining acceptable physical properties, substantial savings will accrue. Possible uses of the chlorinated rubber and polyurethane composite materials are automotive door and window seals, shoe soles, carpet underlay, rollers and solid tires.

The process consists of exposing finely ground rubber particles to chlorine gas, either alone or diluted with another gas. The two most economical gases for such dilution are air and nitrogen, although other relatively inert gases may be used. It will be seen, however, that using an inert gas such as nitrogen results in an accelerated chlorination rate and therefore an improved modulus of the ground rubber particles.

The rubber is generally ground to a particle size of from about 40 mesh U.S. standard, to about 200 mesh U.S. standard, preferably in the range of 80 mesh to about 100 mesh. This grinding can be accomplished in any number of conventional grinding and size reduction processes or machines. The particle size to which the rubber is ground will depend upon the intended application of the rubber as a filler or extender. However, the finer the particle size, the more rapid the subsequent chlorination treatment as to improve the bulk modulus of the rubber particles. The treatment process must be allowed sufficient reaction time to enable the chlorine to diffuse and penetrate into the bulk of the rubber particles. Finer particle size provides a higher surface to volume ratio and reduces the required diffusion or penetration distance into the particle interior. The bulk chlorine content of treated rubber particles is lower for coarser particles and higher for smaller particles. The bulk chlorine content falls within the range of $2 \times 10^{-3}$ to $1.2 \times 10^{10-1}$ grams per square meter of rubber particle surface area. The finely divided rubber particles are exposed to the chlorine-containing atmosphere in a suitable reactor in which the rubber powder may be agitated by stirring, tumbling or by fluidization or agitation by the chlorine-containing gas. The treatment may be carried out by any suitable method of contacting the chlorine-containing gas with the powder. The reactor may be charged with a batch of rubber powder in an initial charge of chlorine containing gas and operated in a batch mode. Powder, as used in describing the reaction, is intended to convey the understanding that the rubber particles used are ground to a fine mesh size. The mesh or size of the particles may range between 0.25 inches (6,350 microns) to 270 mesh (53 microns). It is presently preferred to utilize particles in the range of 10 mesh (2,000 microns) to 100 mesh (149 microns). Alternatively, the chlorine-containing gas may be continuously circulated through the reactor, with or without addition or replenishment of the contained chlorine gas. When used in a continuous addition or recirculation mode, the chlorine-containing gas may advantageously be used to fluidize the rubber powder. Constant recirculation also permits the most efficient use of the contained chlorine and facilitates environmental control. In addition, it is possible to perform the rubber treatment in a fully continuous mode, where chlorine-containing gas and rubber particles are continuously added to and removed from the reactor. To process the rubber safely, the reactor used should be capable of venting dust explosion pressures of up to ten times the starting pressure. Vessels should be designed in accordance with NFPA 68 for ST-1 class dust explosions.

The chlorine concentration in the chlorine-containing gas is generally in the range of from about 5% by volume up to 100%. Generally, a preferred concentration range for the chlorine is from about 10% to about 50% by volume. Higher concentrations of chlorine in the treating gas generally require shorter treatment times. With chlorine concentrations of from about 10% to about 50%, with particle sizes generally in the range of from about 80 mesh to about 100 mesh, and at temperatures in the range of from about 50° F. (10° C.) to about 90° F. (32° C.), treatment times are generally of the order of 1 to 10 minutes for batch reactors. Continuous treatment times can be of 20 to 60 seconds residence time.

After an adequate treatment time in the presence of the chlorine-containing gas, the treated rubber particles are separated from the chlorine-containing gas. The treated rubber particles mass may be purged of the chlorine-containing gas, generally with air or nitrogen, if necessary, depending upon the ultimate use of the treated rubber particlized material. During any desired purging, agitation of the powder is continued to assure full removal of the chlorine-containing gas from the powder mass. Once purged of the chlorine-containing gas, the rubber particles may be used as fillers or extenders, in conventional manner, with various polymer systems, but with the result of higher bulk modulus of the resulting composite polymer than if untreated rubber particles were used for filler or extender. It has been determined that adequate mixing of the chlorine-containing gas coupled with the uniform addition of the gas to the reaction chamber, and to the particlized rubber material, provide sufficient surface treatment of the particles that any need for the post-reaction purge is substantially eliminated.

EXAMPLES

Rubber Chlorination

Samples of rubber contained from reclaimed automotive tires were subjected to the chlorine treatment of this invention in a reactor for contacting the rubber with the chlorine-containing gas at atmospheric pressure and ambient temperature. Suitable reactors would include a Rota-Cone® reactor manufactured by Paul O. Abbe Corp. or a fluidized bed-type reactor. In this example, the reactor consisted of a 316 stainless steel pipe, 6 inches in diameter and 12 inches long. It was fitted with flanges at both ends. Through the top end, a mechanical stirrer entered the reactor. At the bottom end, a sintered, porous stainless steel plate would support the rubber particles while distributing the reactant gas entering from below. The reactor was water jacketed to control the reactor temperature and to remove the exothermic reaction heat.

Chlorine-containing gas was delivered to the reactor throughout the reaction period at rates from 0.20 to 0.49 SCF/min. Temperature of the reactions was at approximately 70° F. (21° C.). The pressure of the reactor was maintained at atmospheric pressure. Gas compositions of from 8–40% $Cl_2$ in air or $N_2$ at atmospheric pressure were evaluated. Treatment levels of 0.02–3.63 SCF $Cl_2$/lb of rubber were used. At equal treatment levels (SCF $Cl_2$/lb rubber), shorter exposure times with higher chlorine concentration in gas) leads to a higher bulk chlorine in the treated rubber (Run 3 compared to Run 8; Run 6 vs. Run 12; Run 1 vs. Run 2; and Run 4 vs. Run 5) for both diluent gases.

Examples of exposure regimens with the resulting bulk chlorine content in the treated rubber, as measured by elemental combustion analysis, are as follows:

| Run | % Cl in gas | Diluent gas | Total CFM gas | SCF $Cl_2$/ lb rubber | Reaction Time (sec) | Bulk % Cl |
|---|---|---|---|---|---|---|
| 1 | 20.0 | Air | 0.2 | 0.182 | 180 | 2.42 |
| 2 | 40.0 | Air | 0.2 | 0.182 | 90 | 4.08 |
| 3 | 40.0 | Air | 0.2 | 0.364 | 180 | 5.38 |
| 4 | 9.2 | $N_2$ | 0.42 | 0.182 | 180 | 1.47 |
| 5 | 25.0 | $N_2$ | 0.32 | 0.182 | 90 | 1.95 |
| 6 | 25.0 | $N_2$ | 0.32 | 0.364 | 180 | 3.23 |
| 7 | 28.6 | Air | 0.28 | 0.04 | 20 | 1.38 |
| 8 | 28.6 | Air | 0.28 | 0.364 | 180 | 3.87 |
| 9 | 28.6 | Air | 0.28 | 1.09 | 540 | 5.58 |
| 10 | 28.6 | Air | 0.28 | 3.63 | 1800 | 6.96 |
| 11 | 28.6 | $N_2$ | 0.28 | 0.04 | 20 | 1 |
| 12 | 28.6 | $N_2$ | 0.28 | 0.364 | 180 | 4.19 |
| 13 | 28.6 | $N_2$ | 0.28 | 1.09 | 540 | 7.03 |
| 14 | 28.6 | $N_2$ | 0.28 | 3.63 | 1800 | 7.96 |
| 15 | 8.2 | $N_2$ | 0.49 | 0.02 | 20 | 0.62 |
| 16 | 8.2 | $N_2$ | 0.49 | 0.182 | 180 | 1.83 |
| 17 | 8.2 | $N_2$ | 0.49 | 0.545 | 540 | 2.92 |
| 18 | 8.2 | $N_2$ | 0.49 | 1.8165 | 1800 | 4.01 |
| 19 | 9.5 | Air | 0.42 | 0.02 | 20 | 0.74 |
| 20 | 9.5 | Air | 0.42 | 0.182 | 180 | 1.89 |
| 21 | 9.5 | Air | 0.42 | 0.545 | 540 | 3.19 |
| 22 | 9.5 | Air | 0.42 | 1.8165 | 1800 | 4.37 |
| 23 | — | — | — | — | — | <0.3 |

Although it was earlier mentioned that the addition of a small amount of fluorine into the chlorine-containing gas would tend to accelerate the treatment, it has been determined that a chlorine-only treatment of the particlized rubber material is of a greater benefit for the ultimate composite polymer and to the environment. A chlorine-fluorine gas treatment process necessarily requires purging after such treatment to remove noxious by-products from the reactor vessel; the chlorine-only treatment process (as described above) does not require such a purge. Additionally, the by-products created by the chlorine-fluorine treatment process must be neutralized in a scrubber when removing such by-products from the reactor vessel which creates additional economic implications for the overall process. It has been found that the chlorine-only treatment process creates virtually no by-products. Further, the addition of fluorine to the treatment process adds a significant cost to the treatment as fluorine gas costs in the range of $50.00/pound of fluorine.

It has also been determined that certain polymer foam composite materials cannot be directly obtained using particlized rubber material surface treated with a chlorine-fluorine gas due to acidic by-products interfering with the foam chemistry. Particularly, a polyurethane foam composite can best be obtained only from particlized rubber material surface treated with a chlorine-only gas.

Various host polymer systems were composited using chlorinated rubber fillers prepared according to the above examples. Examples of these systems and a comparison of their flexural strength and flexural modulus, and tensile modulus, were made using unchlorinated rubber powder and chlorinated rubber powder as filler in the host polymers. It is to be remembered that the term "powder" is to be understood to be rubber particles ground to a fine mesh size.

Urethane Composites

Urethane elastomers containing 15 weight percent of powdered rubber modified according to this invention were prepared using Airthane® PET 95A urethane resin (Air Products and Chemicals, Inc.) and Ethacure® 300 (Ethyl Corporation) cross-linker. The urethane elastomers were prepared by combining the identified rubber with preheated resin at 70°–80° C. with thorough mixing. Entrained air was removed by vacuum until no further outgassing occurred. The resin was then placed in an oven until the mixing temperature of about 85° C. was reached. The resin was then combined with sufficient crosslinker to given an index of 1.05 (equivalent to amine/NCO stoichiometry ration of 0.95). After thorough mixing, the blend was again degassed and then placed in a mold. The sample was cured at 100° C. for 16 hours. The finished specimens were removed from the mold and post-cured for two weeks at a room temperature prior to testing. The following results were obtained in accordance with ASTM D-638.

| Run No. | % Cl in gas | Diluent gas | SCF $Cl_2$/ lb rubber | Reaction Time (sec) | Bulk % Cl | Young's Modulus |
|---|---|---|---|---|---|---|
| 19 | 9.5 | Air | 0.02 | 20 | 0.74 | 73.8 |
| 7 | 28.6 | Air | 0.04 | 20 | 1.38 | 64.1 |
| 20 | 9.5 | Air | 0.182 | 180 | 1.89 | 69.2 |
| 1 | 20.0 | Air | 0.182 | 180 | 2.42 | 72.4 |
| 21 | 9.5 | Air | 0.545 | 540 | 3.19 | 89.1 |
| 8 | 28.6 | Air | 0.364 | 180 | 3.87 | 79.9 |
| 2 | 40.0 | Air | 0.182 | 90 | 4.08 | 81.4 |
| 22 | 9.5 | Air | 1.8165 | 1800 | 4.37 | 114.0 |
| 3 | 40.0 | Air | 0.364 | 180 | 5.38 | 95.7 |
| 9 | 28.6 | Air | 1.09 | 540 | 5.58 | 92.5 |
| 10 | 28.6 | Air | 3.63 | 1800 | 6.96 | 103.2 |
| 15 | 8.2 | $N_2$ | 0.02 | 20 | 0.62 | 136.8 |
| 11 | 28.6 | $N_2$ | 0.04 | 20 | 1 | 76.1 |
| 4 | 9.2 | $N_2$ | 0.182 | 180 | 1.47 | 68.1 |
| 16 | 8.2 | $N_2$ | 0.182 | 180 | 1.83 | 111.2 |
| 5 | 25.0 | $N_2$ | 0.182 | 90 | 1.95 | 68.1 |
| 17 | 8.2 | $N_2$ | 0.545 | 540 | 2.92 | 124.1 |
| 6 | 25.0 | $N_2$ | 0.364 | 180 | 3.23 | 74.1 |
| 18 | 8.2 | $N_2$ | 1.8165 | 1800 | 4.01 | 150.2 |
| 12 | 28.6 | $N_2$ | 0.364 | #80 | 4.19 | 112.0 |
| 13 | 28.6 | $N_2$ | 1.09 | 540 | 7.03 | 149.8 |
| 14 | 28.6 | $N_2$ | 3.63 | #800 | 7.96 | 204.4 |
| 23 | — | — | — | — | — | 64.1 |

Figure 1:
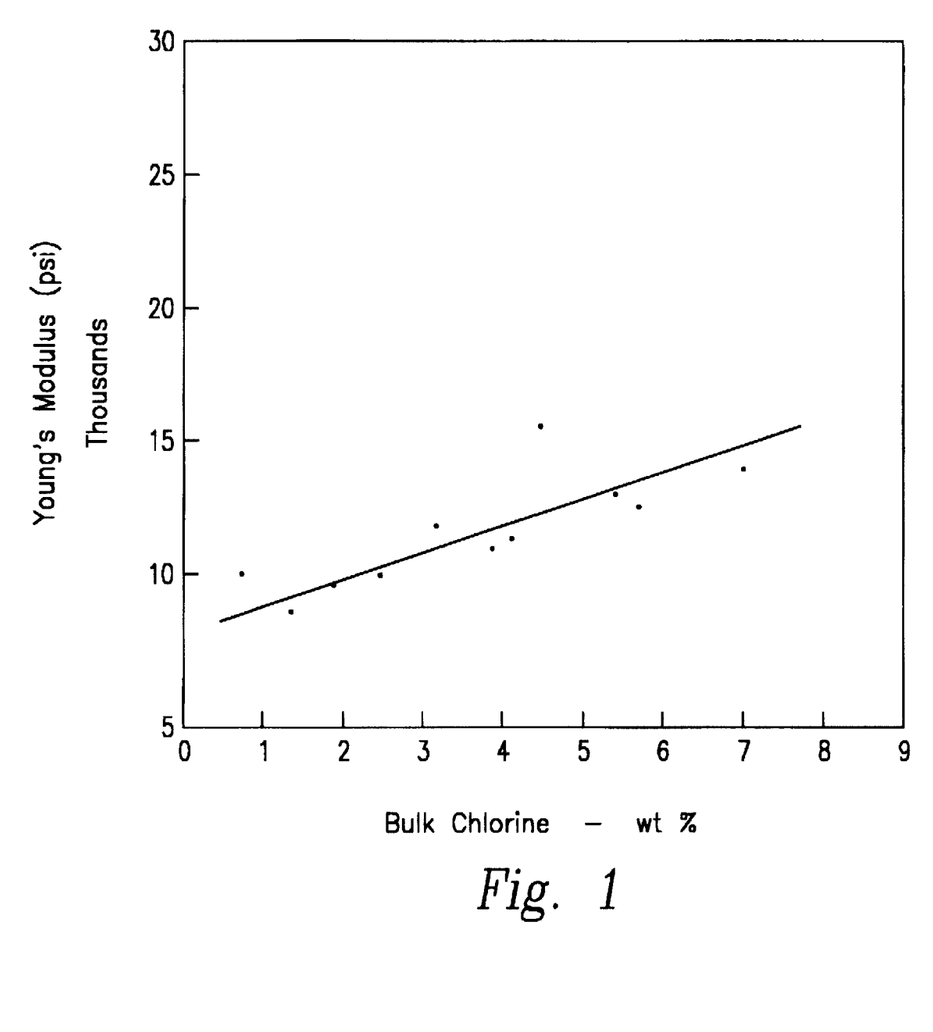
FIG. 1 is a graph of the Young's modulus of the treated rubber as a function of the bulk chlorine content of the treated rubber which has been treated in a chlorine/air mixture.
Figure 2:
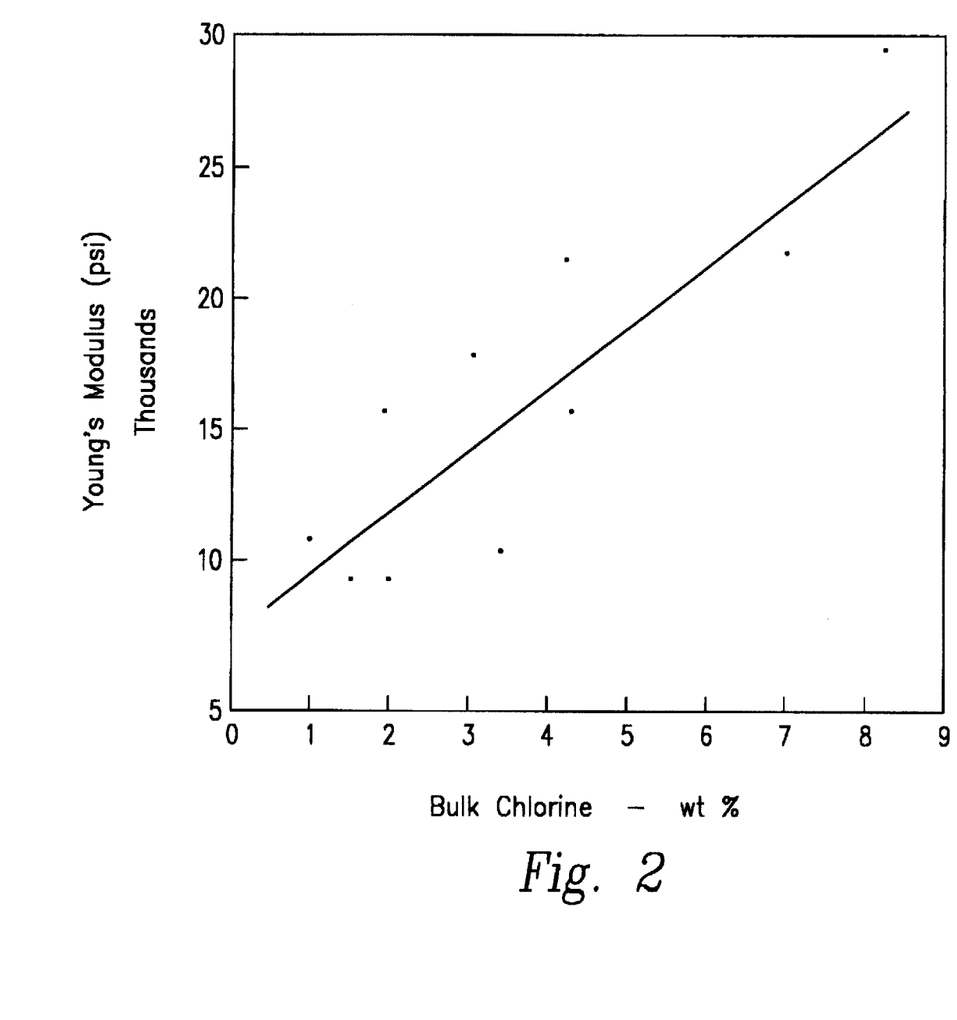
FIG. 2 is a graph of the Young's modulus of the treated rubber as a function of the bulk chlorine content of the treated rubber which has been treated in a chlorine/nitrogen mixture.

FIG. 1 is a graph of the Young's modulus of the polyurethane composite containing the treated rubber as a function of the bulk chlorine content of the treated rubber which has been treated in a chlorine/air mixture. FIG. 2 is a graph of the Young's modulus of the polyurethane composite containing the treated rubber as a function of the bulk chlorine content of the treated rubber which has been treated in a chlorine/nitrogen mixture.

Both $Cl_2/N_2/air$ treatments of the rubber are effective in increasing the modulus of the rubber, but the effect of the $Cl_2/N_2$ treatment on composite bulk modulus is more pronounced.

Polyurethane Foam Composites

Polyurethane foams containing 20 weight percent powdered rubber, both modified according to this invention and not treated, were prepared using LG-56 Arcol® polyol (Arco Chemical Company), Mondur® TD 80 toluene diisocyante (Miles), 33-LV Dabco ® catalyst (Air Products and Chemicals), L-620 surfactant (OSI Specialties). The materials were prepared by combining the identified rubber with the resin mixture at 20° C. to 30° C. with thorough mixing. The resin mixture was quickly poured into a rectangular mold and foamed. The foam composite was cured at 120° C. for forty minutes. The foam composite was removed from the mold, cut to size and tested in accordance with ASTM D-3574. The comparative results were as follows:

| Rubber Treatment | Foam Density | Tensile Strength | Tear Strength | Ultimate Elongation |
| --- | --- | --- | --- | --- |
| None | 2.8 g/cm³ | 15.70 N | 9.86 N/m | 143.2% |
| $Cl_2$/Air | 2.7 g/cm³ | 15.88 N | 11.93 N/m | 148.9% |

Epoxy Composites

Epoxy composites containing 20% by weight rubber were prepared using EPON® 828 Resin (Shell Chemical Company) and PACM-48® curative (Pacific Anchor Chemical Co.). The epoxy materials were prepared in much the same manner as the polyurethanes above except that the resins were not preheated and the curing time was typically 2 hours at 80° C., followed by 2 hours at 150° C., followed by slow cooling at 25° C. Twenty percent of 200 mesh scrap tire rubber which was treated with a gas blend of 1% $F_2$/20% $Cl_2$/% air mixture was added to the epoxy used and compared to untreated rubber of the same source. The flexural modulus and the tensile strength (ASTM D638) of the composite samples were measured. The comparative results were as follows:

| Rubber Treatment | Tensile Strength | Young's Modulus |
| --- | --- | --- |
| None | 4890 psi | 92,300 psi |
| $F_2/Cl_2$/Air | 5284 psi | 94,000 psi |

Polysulfide Sealant

Polysulfide sealant containing 10.6 weight percent powdered rubber, both modified according to this invention and not treated, were prepared with a commonly used resin mixture [major constituents: LP-32 resin (Morton), Cereclor® 56L chlorinated plasticizer (ICI), calcium carbonate (53.1%)] and a catalyst composition (magnesium oxide (Caras), lead oxide (Eagle Picher), carbon black (Thermax), and Santicizer 278 butyl benzylthalate. The materials were prepared by combining with thorough mixing at ambient temperature and subsequently degassed under vacuum. The composite mastic was pressed into a mold and cured overnight at ambient temperatures. The samples were then post-cured at 120° F. for 48 hours. The cured materials were removed from the mold, cut to size, and tested in accordance with ASTM D-412. The comparative results were as follows:

| Rubber Treatment | Tensile Strength | Tear Strength | Ultimate Elongation | Modulus |
| --- | --- | --- | --- | --- |
| None | 86.0 psi | 16.6 lbs/in | 63.7% | 354.2 psi |
| $Cl_2$/Air | 135.1 psi | 20.5 lbs/in | 85.7% | 389.4 psi |

Unsaturated Polyester Composites

Unsaturated polyester composites containing 20% by weight of 80 mesh scrap tire rubber were prepared using COR® 61aa Resin and methyl ethyl ketone peroxide. The materials were processed in the essentially the same manner as the epoxy samples above except that the resin was allowed to initially cure at room temperature and briefly post-cured at 100° C. for 4 hours. Rubber which was treated with a 2.5% $F_2$/40% $Cl_2$/air mixture was used and compared to untreated rubber of the same source. The flexural modulus and the flexural strength ASTM D79OM) were measured. The comparative results were as follows:

| Rubber Treatment | Tensile Strength | Young's Modulus |
| --- | --- | --- |
| None | 13.4 MPa | 1489 MPa |
| $F_2/Cl_2$/Air | 23.2 MPa | 1882 MPa |

Further tests were also conducted to determine the amount of increased wet traction which could be achieved on particular surfaces. One of the surfaces on which tests were conducted was concrete, the other surface being steel.

To accomplish the desired testing on the selected surfaces, treated rubber particles were added to the composition of specialty vehicle tires, shoe sole composites, pulley wheels and rollers used for material transport. The specialty vehicle tires in which the treated rubber composition has been tested are non-inflatable tires used, for example, on lift vehicles and the like. The pulley wheels may be utilized in transportation systems such as escalators. The material transport systems in which the rollers have been tested are material transport systems for moving large, heavy materials such as sheet steel. Further, material transport systems may have rollers which function in juxtaposed positioning to form a gripper roller system which may be utilized in paper product manufacturing, e.g. forming envelopes, etc. In all instances, it has been the goal to increase the frictional contact between the treated rubber element and the surface which it contacts. Tests were performed on two exemplary surfaces, concrete and steel, as set forth in the following two examples:

Wet Coefficient of Friction

Andur 2-60 DP Polyurethane (Anderson Dev. Co.), containing the weight percent particlized rubber material, modified according to this invention, was cured with Curene® 422 (Anderson Dev. Co.) 4,4'-methylene bis (ortho-chloroaniline) [MBOCA] at 100° C. in a mold at ambient pressure. The cured materials were removed from the mold, cut to size, lightly sanded to expose the rubber and tested in accordance with ASTM D 1894-90 (modified). The comparative results were as follows:

| Weight % Treated Particlized Rubber | Coefficient of Friction on Concrete | |
| --- | --- | --- |
| | Static | Dynamic |
| 0 | 0.98 | 0.72 |
| 10 | 1.00 | 0.82 |
| 20 | 1.06 | 0.87 |

The test results show a clear increase in the coefficient of friction on both surfaces with the treated rubber particles, which results in significantly better traction and gripping.

Adiprene® LF-95 polyurethane (Uniroyal Chemical Co.) was cured with Ethacure® 300 (Ethyl Corporation) at 100° C. and pressed into a mold, allowing the curing to occur at ambient pressure. The cured materials were removed from the mold, cut to size, and tested in accordance with ASTM D-1894-90 (modified). The comparative results were as follows:

| Weight % Treated Particlized Rubber | Coefficient of Friction on Steel | |
| --- | --- | --- |
| | Static | Dynamic |
| 0 | 0.57 | 0.55 |
| 20 | 0.58 | 0.69 |

END PRODUCT EXAMPLES

Inline Skate Wheels

Inline skate wheels have very poor traction on wet surfaces such as concrete and asphalt. They also "glaze" quickly, limiting their usefulness in such sports as street hockey and acrobatics. Urethane elastomers containing 15 weight percent of powdered rubber being surface modified according to this invention were prepared using Airthane PET 80A urethane resin (Air Products & Chemicals, Inc.) and Ethacure® 300 cross-linker (Ethyl Corporation). The urethane elastomers were prepared by combining dried rubber (30 minutes at 100° C.) with preheated resin at 70°–80° C. with thorough mixing. Entrained air was removed by vacuum until no further outgassing occurred. The resin was then combined with sufficient crosslinker (amine/NCO stoichiometry ratio of 0.95). After thorough mixing, the blend was again degassed and placed in a mold. The mold was specially designed to hold a pre-molded hub in place, where the hub functions as a bearing holder. The samples were cured at 100° C. for 16 hours. The set of eight finished wheels were removed from the mold and found to have a hardness of Shore 78A. The set of eight wheels were installed on a pair of inline skates and sanded slightly to expose the treated rubber, as a thin skin of polyurethane covers the surface. Filled and unfilled wheels were compared on smooth, wet pavement. Unfilled wheels were extremely slippery; maintaining balance and pushing forward were almost impossible. The rubber-filled wheels had greatly improved traction, virtually comparable to dry pavement as set forth in the immediately preceding table pertaining to Coefficient of Friction on wet surfaces.

Solid Cast Polyurethane Industrial Wheels and Forklift Tires

Treated rubber/polyurethane formulations for molding a variety of industrial tires, casters and wheels were developed for testing. These prototypes were made and tested with as much as 46.5% by weight of treated rubber particles. Industrial tires, casters, wheels and, in some cases, rollers, require the physical property sufficient to support the weight of a variety of loads placed on them without suffering significant deformation, shattering or tearing apart while in use. The capacity to support the load applied to this variety of tires, casters, wheels and rollers is, by necessity, a compromise between a hardness of the composite material against the resiliency of that material while maintaining an appropriate coefficient of friction. Increased resiliency results in a softer tire which permits increased deformation of the tire while in use, ultimately causing heat generation, tearing and failure. Thus, the inclusion of treated rubber in the polyurethane composite material for the tires, casters, wheels and rollers creates the compromise between hardness and softness for load support, resiliency for wear resistance, and maintains a sufficient coefficient of friction to achieve appropriate traction for the particular application. The variety of industrial tires, casters, wheels and rollers can be made using the process described above in connection with inline skate wheels. In general, the molding tests and the subsequent performance testing of the wheels were quite successful resulting in increased wet traction.

Microcellular Polyurethane Tires

Several formulations for microcellular polyurethane tires in formulations using treated rubber have also been developed. The tires made were to be used for wheel chairs, bicycles and carts. These developmental efforts employed loading levels of treated rubber particles as high as 30% by weight. Prototype test tires were molded from isocyanate based castable polyurethane elastomer/foam resin. Laboratory and field testing of the various wheels revealed that the performance of the specimens made in treated rubber particles/polyurethane were nearly identical to those of tires made of unfilled polyurethane. Once again, inclusion of rubber which was surface treated by the above process improved the wet traction of the wheels. Powered and manual wheelchair wheels made of 10% treated rubber/90% polyurethane were field tested. Prior to the use of treated rubber, these types of wheels had insufficient wet traction, a significant problem when negotiating wet inclined ramps. The increase in wet traction of the microcellular polyurethane tires containing surface modified rubber by the process described above may only be temporarily realized by any similar process such as by adding powdered rubber to polyurethane material, where the powdered rubber had been treated with a desiccant. Moreover, lacking any significant matrix-particle bonding achieved by the present process using treated rubber to be mixed with the polyurethane formulation creating a stronger more resilient composite material, non-bonded rubber particles will be pulled from the surface with the increased traction lost in direct proportion to the loss of rubber particles.

Further, with a more resilient or "softer" tire, there is a cushioning effect especially with such tire used on wheelchairs. With tires constructed according to the invention, there is no longer a need to resort to pneumatic tires for this specific use, or similar uses of spoked tires, such as on bicycles and carts. It has also been shown that the surface modified rubber (treated in accordance with the present invention) when combined with moisture sensitive materials such as polyurethane precursors (polyols, isocyanate and/or a blowing agent) can be dried by methods which include thermal drying (by heating the composite mixture), chemical desiccation, or physical desiccation in order to achieve the formation of polyurethane having the desired physical properties.

Polyurethane Coating For Parking Garage Decks

Coatings are commonly applied to parking garage decks to prevent water and salts from penetrating the concrete and corroding the steel reinforcement. Such coatings are very slippery for vehicular and pedestrian traffic unless a profile additive is used. Inorganic aggregate additives such as sand, alumina, or carborundum are only fair traction enhancers. They create other problems by weakening the coating and even cutting through to the concrete. Inorganic aggregates are also poorly adhered to the coating and readily disengage from the polymer coating during usage. The addition of treated rubber particles to the polyurethane formulation achieves a lesser reduction in tear resistance and tensile strength with the combination of the treated rubber particles than with the inorganic aggregate additives listed above. By way of explanation, the base coating has an elastomeric property to create a moisture barrier between the external environment and the porous concrete of the parking garage deck. The mid or top coating has a much less significant elastomeric property but has a greater resistance to abrasion and a significantly higher coefficient of friction to provide an anti-slip surface for vehicular and pedestrian traffic.

Surface Treated Rubber in "Mid-Coat"

A moisture-cured urethane elastomer coating containing approximately 40 weight percent of powdered rubber, which has been treated and surface modified according to the invention, was prepared using "Sonneguard Base Coat" and "Top Coat" resins (Chemrex, Inc.). A Base Coat layer was applied to concrete (0.025" wet, 0.020" dry). After curing, a layer of Top Coat was applied (0.017" wet, 0.012" dry) and the surface treated rubber was "broadcast" onto the surface at a rate 10.75 lbs per 100 ft$^2$. Finally, a second layer of Top Coat was applied (0.017" wet, 0.012" dry). A Sand-in-Midcoat control sample was prepared identically except sand was broadcast onto the surface at a rate of 41.5 lbs. per 100 ft$^2$. Both samples were tested in accordance with the crack bridging test of ASTM C957. The samples passed the $\frac{1}{16}$" criteria with no tearing or cracking in any layer. Physical property testing was also done on coatings removed from the substrate with the results shown in the following Table.

| Property | Sand-in-Midcoat | Rubber-in-Midcoat |
| --- | --- | --- |
| Tensile Force | 2.1 lbs | 6.3 lbs |
| Tensile Elongation | 18% | 81% |
| Die-C Tear Force | 3.7 lbs | 7.5 lbs |

In a subsequent field trial, this procedure was modified slightly. After the treated rubber was broadcast into the top coat, the composite mixture was "back-rolled" to ensure intimate contact. This procedure worked quite well with the advantage that back rolling a single top coat eliminates the need for a mid-coat and a top coat resulting in less labor.

Surface Treated Rubber in "Base Coat"

A Base Coat layer of composite material similar to that recited immediately above was applied to concrete (0.025" wet, 0.020" dry). Surface treated rubber was broadcast-to-excess at a rate of 20 lbs per 100 ft$^2$. After curing, the excess rubber (3.6 lbs per 100 ft$^2$) was removed with a brush and vacuum cleaner. A Top Coat layer was then applied (0.034" wet, 0.024" dry) and allowed to cure. A Sand-in-Midcoat sample control was prepared identically to that of the "Mid- or Top-Coat" example. Samples were tested in accordance with the crack bridging test of ASTM C957. The samples passed the $\frac{1}{16}$" criteria with no tearing or cracking in any layer. Physical property testing was also done on coating removed from the substrate with the results shown in the following Table.

| Property | Sand-in-Midcoat | Rubber-in-Midcoat |
| --- | --- | --- |
| Tensile Force | 2.1 lbs | 7.3 lbs |
| Tensile Elongation | 18% | 43% |
| Die-C Tear Force | 3.7 lbs | 10.5 lbs |

Epoxy Formulation-Synergy with CTBN Flexibilizers

Epoxy composites containing surface treated rubber (200 Mesh) were prepared using EPON 836 resin (a DGEBA epoxy with EEW =290 to 335) (Shell Chemical Company), piperidine curative (Aldrich Chemical Company) and Hycar CTBN 1300X8 liquid rubber flexibilizer (B. F. Goodrich). CTBN is the generic name for a family of elastomer additives for epoxies, with the primary elastomer being functionalized butadine-acrylonitrile copolymer. These elastomers are available as epoxy, carboxy, amino and vinyl terminal functionalities. This example deals with carboxy-terminated butadine—acrylonitrile copolymer—CTBN.

The composites were prepared by first preheating and degassing the resin at 90° C. for one hour. Next the CTBN and rubber were added and mixed under vacuum for one hour. The resin was then combined with sufficient curative to crosslink the epoxy. After thorough mixing, the blend was placed in a mold and the sample cured at 150° C. for 16 hours. The finished plaques were machined to size and tested according to fracture toughness test ASTM D5045-93. As the mixture cures, the CTBN liquid rubber flexibilizer phase separates and forms small rubber domains (1 to 5 microns). A synergy was found between the CTBN and the larger (75 micron) rubber particles as shown in the Table below.

| EPON 836 (grams) | Piperidine (cm$^3$) | CTBN (grams) | Treated Rubber (grams) | Fracture Toughness Kic (MPa.m$^{0.5}$) |
| --- | --- | --- | --- | --- |
| 100 | 3.65 | 0 | 0 | 0.98 |
| 100 | 3.65 | 0 | 10 | 1.15 |
| 100 | 3.65 | 75 | 2.5 | 3.30 |
| 100 | 3.65 | 10 | 0 | 3.14 |

From the foregoing Tables, it can be clearly seen that the treated rubber particles increase the fracture toughness which is resistance to crack propagation in the final composite material.

Epoxy Formulation-New Solid Rubber Modifier

Based on the knowledge obtained in the previous experiment, a novel solid rubber modifier has been developed for toughening of epoxy polymers. Epoxy composites containing surface treated rubber (200 Mesh) were prepared using DER 331 resin (a DGEBA epoxy with EEW=182 to 192) (Dow Chemical Company), piperidine curative (Aldrich Chemical Company), Paraloid EXL-2691 rubber particles (Rohm & Haas Co.). The Paraloid is a solid rubber core with a thin acrylic shell copolymer which is synthesized in an emulsion process and then spray-dried. These particles have the advantage to being easier to handle a liquid CTBN and less sensitive to mixing and cure rate conditions. (Improper conditions lead to CTBN domains outside the 1 to 5 micron optimum range). The composites were prepared by adding the surface treated and Paraloid rubbers and mixing for one hour. The mixture was heated to 80° C. and mixed under vacuum for two hours. The mixture was then combined with sufficient curative to catalyze crosslinking. After thorough mixing, the blend was placed in a mold and the sample cured at 120° C. for 16 hours. The finished plaques were machined to size and tested according to fracture toughness test ASTM D5045-93. The blend of Paraloid and surface modified treated rubber outperformed CTBN as shown in the Table below.

| EPON 836 (grams) | CTBN (grams) | Paraloid (grams) | Treated Rubber (grams) | Fracture Toughness Kic (MPa.m$^{0.5}$) |
|---|---|---|---|---|
| 100 | 0 | 0 | 0 | 0.90 |
| 100 | 10 | 0 | 0 | 2.07 |
| 100 | 0 | 7.5 | 2.5 | 2.58 |

EVA Shoe Soling Formulations

From the late 1970's and early 1980's, the shoe soling industry has been using EVA (ethylene vinyl acetate) as a base material for many of its soling and midsoling products. When properly formulated, this family of materials can be expanded (foamed) to provide outsoling used in premium products.

The properties of EVA products are determined by the materials with which it is blended and the density. For outsoling, EVA is usually blended with an elastomer to provide the elastic cushioning required. For other applications it is normally blended with polyethylene. The usual quality tests are for Shore A Hardness of a cut internal surface, specific gravity and cell uniformity.

Samples were prepared which indicated that treated rubber particles could be added to some standard EVA recipes. All formulations used contained EVA and polyethylene, which are the bases for products produced. The polyethylene provides some stiffness and lowers the cost.

Modifications to EVA products are accomplished by adding a second or sometimes a third polymer. The most significant limitation on the these materials is compatibility of cure. Additional materials must be peroxide cured, or compatible with a peroxide curing system and have reasonable physical properties. For the former reason, SBR and polybutadiene are rarely used, as they exhibit poor properties with peroxide systems. The obvious materials which can be used with EVA, in addition to polyethylene are EPDM, natural rubber, CPE, CSM, modest amounts of high styrene SBR resin and NBR. All these materials are expensive, and all except perhaps CSM, are in use now.

Three parts of magnesium oxide (Maglite D) are added to the formulations tested. The magnesium oxide is used to neutralize the HCl known to be released from the surface of the treated particles and is common practice with chlorinated polymers.

The standard types of measurement for these products are density, hardness and flex. Wear measurements are not standard as EVA wears out quickly. Nonetheless, wear lifetime is important in outsoling applications. Since natural rubber can be added to EVA, it was thought that there might be some slip resistance benefit to doing so.

Flex testing of the samples was carried out on a Ross Flex machine at room temperature. The usual criterion for passing is less than 500% growth of the initiated slit after 100,000 cycles. This is done on a midsoling piece 1/8" thick, or outsoling 1/4" thick.

As the treated rubber has a reactive surface, it was anticipated that coupling agents might be effective in improving interaction of the treated rubber with the matrix into which it was incorporated. Experimental work was carried out with a selection of coupling agents in order to determine their effectiveness.

From an experimental standpoint, there is some difficulty inherent in EVA systems. EVA is sold in pellet form, and its compounds are quite boardy at room temperature so that the compound must be hot during processing. The stiffness at room temperature requires attention to the dimension of the uncured piece placed in the mold for curing. Molds for EVA's should be teflon coated as mold release sprays cause difficulties. Because of the high pressure from expansion, the product grows rapidly, immediately when the mold is opened. The mold must therefore be angled in such a fashion that the expansion is unencumbered.

The mold was Teflon coated (Mangren treatment) an had dimensions of 7/16" depth, and an approximately 45° tapered surface with 3 1/8"×4 11/16" dimensions at the base (the small dimension). Expansion provided finished pieces with length dimensions ranging from 5 5/8" (density about 0.49) to 7 7/8" (density about 0.12).

After cooling, the samples were measured, their densities determined, and their Hardnesses determined on the surface, and in some cases internally on a cut surface. Some were measured for NBS Abrasion Index, and for some coefficients of friction were determined on masonry surfaces (both wet and dry) after the samples had been previously abraded to expose fresh surface. A commercially available outsole was also obtained and measurements were made on density, abrasion resistance, hardness and coefficient of friction.

The coefficient of friction of the various soling materials were tested for comparison on tread lugs as well as on a flat, buffed surface. Tested differences were small so that similar physical performances were obtained as are shown in the Table below.

| Formulation | Density (g/cc) | Hardness (Shore A) | Abrasion (NBS) | Slip (Cf dry) | Slip (Cf wet) |
|---|---|---|---|---|---|
| EVA/PE/EPDM (50/25/25) | 0.30 | 50 | 70 | 0.61 | 0.57 |
| EVA/PE/EPDM/ Treated Rubber (w/coupling agent) (40/25/15/20) | 0.43 | 61 | 29 | 0.70 | 0.52 |
| EVA/PE/Treated Rubber (Reduced Silica) (50/30/20) | 0.25 | 49 | 42 | 0.59 | 0.52 |
| Commercial Soling Material | 0.39 | 55 | 40 | 0.70 | 0.59 |

Nitrile Rubber Compounds

Investigations have been carried out on the effect of treated rubber particles on the physical properties of various NBR formulas. We have found that the surface treatment on the rubber in accordance with the invention provides marked improvement in compatibility of the product over untreated ground rubber.

Treated rubber particles (60 mesh) can be used effectively as a viable method of adding inexpensive recycled material to NBR formulas. The negative effects on stress-strain properties are minimal, especially compared to untreated, recycled rubber.

Up to 75 phr treated rubber has been successfully added to NBR formulations with processing remaining acceptable. Under all conditions the treated rubber shows a significant superiority over untreated 60 mesh rubber. The addition of treated rubber will cause the Shore A hardness of the rubber to which it is added to approach 65. So within the 60–70 range, there is little necessity to significantly adjust the filler system. Tensile strength reduction versus control compounds is reduced by an average of 0.5 to 0.6% per phr treated rubber added. By comparison, untreated 60 mesh rubber reduces tensile strength by 1.0 to 1.25% per phr added. Modulus values are relatively unaffected. As shown by the measured physical properties, there is no apparent necessity to add magnesium oxide. Aging of samples for 70 hours at 125° C. has shown no advantage at levels of MgO between 0 and 8 phr. The NBS Abrasion Index is reduced approximately 0.4% per phr treated rubber added. Ross Flex values (RT, 56 Kc) showed no differences from control (no growth). C-Tear values showed the same trend as tensile strength, 0.3 to 0.9% reduction per phr treated rubber added. Standard mixing methods were used with the test results shown in the Table below.

| Formulation | Hardness (Shore A) | Tensile (psi) | Elong (%) | C-Tear |
|---|---|---|---|---|
| Control (no Mgo) | 68 | 2840 | 460 | 349 |
| 30 phr Surface Treated Rubber (60 Mesh) (no MgO) | 71 | 2360 | 310 | 309 |
| 30 phr Surface Treated Rubber (60 Mesh) (5 phr MgO) | 71 | 2260 | 340 | 289 |
| 30 phr Rubber (60 Mesh) dust | 65 | 1230 | 550 | — |
| 30 phr Rubber (60 mesh) dust (5 phr MgO) | 65 | 1230 | 460 | 240 |

Microscopic observation of failed tensile test pieces showed differences in appearance in failures between control, treated rubber compounds, and analogous untreated rubber dust compounds. Control formulas showed relatively flat cross-sections. The 60 mesh rubber dust formulas showed numerous peaks and areas of discontinuity. The treated rubber containing samples were similar to the rubber dust but much less severe, with some more planar areas observed.

Thermoplastic Elastomers

One thermoplastic elastomer was chosen for initial evaluation, Kraton® G, a styrene-ethylene/butylene styrene copolymer (Shell Chemical, Inc.). Two particle sizes of surface modified rubber particles 60 mesh screen (250 micron) and 200 mesh screen (75 micron) were used. The surface modified rubber was dry blended with the matrix material. A Buss kneader extruder was used to compound the material. Barrel temperatures matched those recommended by the matrix resin manufacturer. The Buss had a vacuum vented barrel section to remove moisture vapor or other gases evolved during compounding (pre-drying the materials in a hopper dryer would otherwise be advisable). Strands were cooled in a water bath and chopped to yield compounded pellets. Pellets were then pressed out in a hydraulic press to 0.050 inch thickness. Test specimens were die cut to ASTM specifications. Hardness (Shore A), tensile, and tear properties were measured five times.

The materials compounded easily and the appearance of the pellets and test specimens were smooth and void-free with the test specimens having the appearance of black plastic. No strong odors were detected, even temperatures as high as 410° F. However, a ventilation snorkel was used at the extrusion die.

The material chosen represents the family of thermoplastic elastomer materials. It is important to note that these materials are often used in compounds with inorganic fillers, whereby physical properties are generally lower than would be seen with the virgin resins. The Kraton® compound results indicate that with incorporation of surface-modified rubber particles, tear-strength increases over 200% while tensile strength decreases only 10% as shown in the Table below.

| KRATON® | Units | Unfilled | Filled 25% Treated Rubber | |
|---|---|---|---|---|
| | | | 60 Mesh | 200 Mesh |
| Hardness | Shore A | 59 | 63 | 63 |
| Modulus @ 50% | MPa | 1.10 | 1.41 | 1.42 |
| Modulus @ 100% | MPa | 0.71 | 0.72 | 0.62 |
| Die-C Tear | kN/m | 19.6 | 31.2 | 66.0 |
| Break Strength | MPa | 5.03 | 4.50 | 4.50 |
| Elongation at Break | % | 732 | 417 | 472 |

Thermoplastic elastomers, modified with the surface treated rubber of the present invention, were found to be useful in a variety of articles, including shoe soling materials, wire and cable sheathing, and hosing and flexible tubing, for the reason that these materials exhinbited significantly improved tear resistance.

Structural Adhesives

Perhaps the most critical characteristic for an adhesive in its end use is the strength of the bond that it forms. In practice, many factors can affect adhesive joint strength, including the internal strength of the adhesive, the ability of the adhesive to wet the substrate, the bond thickness, and the adhesive bonding area. The internal strength of the adhesive is often related to its modulus, which is a measure of the stiffness of the material. As a rule of thumb, both very high or very low modulus materials are undesirable as adhesives. A material with too high a modulus will tend to be brittle, causing the material to crack under stress. A low modulus material is often weak and tears easily.

Rubber may be used as a modulus modifier in many adhesives. This tough, flexible material resists both cracking and tearing. Because of its desirable elastomeric properties, rubber can be used to modify materials with unacceptable moduli. Unfortunately, natural and synthetic rubbers are incompatible with many structural adhesives because many rubbers are nonpolar and the ingredients in many structural adhesives are polar in nature.

The strength of an adhesive bond is strongly dependent on the ability of the adhesive to wet the substrate. By wetting we mean the tendency of a material to form a broad area of intimate contact with a surface, on a molecular level. Intermolecular forces fall off rapidly as the distance between molecules increases. Most surfaces are actually quite rough when examined microscopically. Therefore, it is important to achieve intimate contact between the adhesive and substrate in order for the attractive forces to take effect.

A good measure of the attractive forces in a material is its critical surface energy. Materials with higher surface energy tend to exhibit higher attractive forces than substances with low surface energy. In other words, materials with strong hydrogen bonds tend to have higher surface energies than other polar materials and polar materials tend to have higher surface energies than other nonpolar materials. Just as materials with strong intermolecular forces resist wetting substances with weaker attractive forces, materials with high surface energies resist wetting low surface energy substances. Therefore, to ensure sufficient substrate wetting, the surface energy of the adhesive should be lower than that of the substrate.

An adhesive joint is formed when two substrates are bonded together with an adhesive. The joint contains three areas of interest, the substrates, the interfaces between the substrates and adhesive, and the adhesive. Joint failure can occur in any of the three areas.

Interfacial adhesion failures occur when the bond strength at the interface is less than the internal strength of the adhesive or the substrate. Failure at the interface is called adhesive failure and is indicated by a clean substrate surface upon bond separation. Failures within an adhesive occur when the internal strength of the adhesive is the weakest link in the joint. Internal adhesive failures are called cohesive failure and are indicated by a continuous, thick coating of adhesive on both substrates after bond rupture—the thicker the coating, the better. Cohesive failure is generally the preferred mode of failure as it is more conducive to predictable joint life.

The strength of the adhesive joint is affected by the intermolecular attractive forces discussed earlier as well as the bulk properties of the adhesive. One of the most important bulk properties affecting adhesion is the modulus of the adhesive material. In general, low modulus substances make the most useful adhesives. A lower modulus aids adhesion in two ways. First, low modulus materials tend to be flexible. This flexibility allows low modulus substances to easily confirm to the adherent, which reduces the distance between the adhesive and substrate molecules. The resulting intimate contact facilitates the intermolecular attractive forces responsible for adhesion.

The second way that low modulus materials aid adhesion is by reducing peak stresses at the bond interface. Brittle, high modulus materials tend to fail near the adhesive interface, resulting in a very thin coating of adhesive on the substrate upon rupture. By definition, low modulus materials deform more under the same stresses and thereby create more uniform stress distributions. In a joint, this moves the stress concentration away from the interface and into the adhesive. The resulting thick film cohesive failure indicates a more durable bond than the thin film failure typical of high modulus materials.

Although low modulus adhesives tend to improve adhesion, it is important to ensure that the modulus does not become too low. Very low modulus materials tend to have lower strength and tear easily. Therefore, it is important to maintain an adequate modulus to withstand the stresses expected in the adhesive application.

Rubber materials have many characteristics that are desirable in an adhesive such as flexibility, toughness, impact resistance and cold properties. Because of its compatibility with polar substances, the surface treated rubber of this invention can be used to create adhesives with the excellent elastomeric properties of rubber as well as the desirable properties of polar adhesives. Epoxy and polyurethane structural adhesives containing surface treated rubber can be used to create adhesives with the excellent internal consistency properties of rubber as well as the desirable properties of polar adhesives. Epoxy and polyurethane structural adhesives containing surface treated rubber were tested as described in more detail below.

Epoxy Adhesives

Two particle size materials (60 and 200 mesh) were studied using surface treated rubber in a basic epoxy formulation which was substituted for inorganic filler on a weight basis. However, since rubber is less dense than inorganic filler, both epoxy resin and inorganic filler effectively were replaced on a volumetric basis. The basic formula contained two epoxy resins (standard and CTBN rubber-modified), two curing agents, and a precipitated calcium carbonate filler that acted as a thixotrope.

In the first study, 60 mesh surface treated rubber was used at levels of 4.4 and 12.5 weight percent. In a second study, 200 mesh surface treated rubber was used at levels of 4.4, 12.5 and 35.6 weight percent. The 35.6 weight percent was achieved by removing all of the calcium carbonate filler. Results for the studies show shear overlap increased over 20% with the addition of 12.5 weight percent surface treated rubber.

Interestingly, the shear overlap of the 60 and 200 mesh particles were remarkably similar. In the 200 mesh case, the appearance, viscosity, and slump properties were similar to the control or could be readily corrected in future optimization studies. For example, the viscosities for all materials were similar to the control except for the batch containing no calcium carbonate filler. Although the slump values increased with greater levels of treated rubber (due to decreases in calcium carbonate thixotrope), they can probably be lowered through formulation optimization without excessive effort, such as with the addition of a chemical or fiber thixotrope.

The treated rubber provided an unexpected benefit in the area of adhesive strength and quality. With other approaches, generally as the adhesive strength increases, we see an associated decrease in the quality of the failure mode; a tendency to change from thick-film cohesive to thin film or adhesive failure. However, as the level of surface treated rubber increased from 0 to 12.5 weight percent, the strength of the shear overlaps increased and the failure mode moved closer to thick film cohesive failure as shown in the Table below.

|  | Control | | 60 Mesh | | | 200 Mesh | |
|---|---|---|---|---|---|---|---|
|  | E-1A | E-1B | E2 | E3 | E4 | E5 | E6 |
| Wt % Epoxy | 64.4 | 64.4 | 64.4 | 64.4 | 64.4 | 64.4 | 64.4 |
| Wt % CaCO3 | 35.6 | 35.6 | 31.2 | 23.1 | 31.2 | 23.1 | — |

Treated Rubber Particle Size

-continued

|  | Control | | Treated Rubber Particle Size | | | | |
|---|---|---|---|---|---|---|---|
|  | | | 60 Mesh | | | 200 Mesh | |
|  | E-1A | E-1B | E2 | E3 | E4 | E5 | E6 |
| Wt % Treated Rubber | — | — | 4.4 | 12.5 | 4.4 | 12.5 | 35.6 |
| Vol % Epoxy | 80.3 | 80.3 | 77.7 | 73.4 | 77.7 | 73.4 | 63.4 |
| Vol % CaCO3 | 19.7 | 19.7 | 16.7 | 11.7 | 16.7 | 11.7 | — |
| Vol % Treated Rubber | — | — | 5.5 | 14.9 | 5.5 | 14.9 | 36.6 |
| Shear Overlap (psi) | 1,400 | 1,339 | 1,658 | 1,602 | 1,545 | 1,660 | 1,164 |
| % Cohesive Failure | 100%[1] | 100%[1] | 100%[2] | 100%[2] | 100%[1] | 100%[2] | 100%[3] |
| Flexural Modulus (psi) | — | 4,152 | — | — | 3,495 | 3,123 | — |
| Viscosity (76F.) (sec.) | | | | | | | |
| Initial | 112 | 112 | 140 | 125 | 125 | 120 | 850 |
| 3 day 100F. | 105 | 180 | 150 | 115 | 180 | 220 | too stiff |
| Slump (flow) (mm) | 1.6 | 1.6 | 3.0 | 7.0 | 4.7 | 8.0 | 0.0 |
| Appearance (10 = best) | | | | | | | |
| Surface | 8 | 9 | 6 | 5 | 8 | 9 | 4 |
| Gloss | 9 | 9 | 8 | 8 | 8 | 9 | 3 |
| Uniformity | 9 | 9 | 8 | 8 | 7 | 9 | 7 |

1 - very thin film  2 - thin film  3 - cohesive

An examination of the flexural modulus results may shed light on the ability of surface treated rubber to improve adhesion. Epoxies tend to be brittle materials, consistent with the high modulus of the control formulation. Although the epoxy control had the ability to form a strong bond with the metal surface, its brittleness forced the peak stress toward the adhesive interface. As a result, a very thin coating of the adhesive remained after the shear overlap ruptured. As the level of surface treated rubber increased, the flexural modulus decreased and the peak stress moved further back into the adhesive, resulting in a thicker coating of adhesive upon rupture (thin film as opposed to very thin film). A further increase in surface treated rubber to 35.6 percent resulted in shear overlaps with total cohesive failure, indicating a uniform distribution of stresses. Although the modulus of the 35.6 percent materials was not measured, it presumably followed the trend of decreased moduli with increasing levels of treated rubber.

The control epoxy formulation in this study is an example of an adhesive with an excessively high modulus. Although the material adhered well to the substrate (high interfacial adhesive strength), its brittleness forced the peak stress toward the bond line. It appears that reducing the modulus to a critical level increased the tendency for cohesive failure as well as the shear strength. After reaching the critical level, further reductions in moduli would be expected to decrease the strength of the joint. The reduced strength of the 35.6 percent treated rubber adhesive tends to support this hypothesis.

Polyurethane Adhesives

Two particle size materials were studied using surface treated rubber in a polyurethane adhesive. In a first study, 60 mesh surface treated rubber was used at levels of 12.5 and 30 weight percent of the formula. As with the epoxy adhesives, the textured appearance of the polyurethane batches led us to include a finer grade of treated rubber. In a second study, 200 mesh surface treated rubber was used at levels of 12.5, 18, 23 and 30 weight percent of the formula. All of the batches had an acceptable appearance.

Shear overlap results increased over 30% with the addition of 18 weight percent treated rubber. Increasing levels of treated rubber resulted in stronger adhesive bonds. However, beyond a critical point (around 18% treated rubber) the mode of failure switched to undesirable adhesive failure. Consistent with our prior findings, the increase in strength was most likely due to an increase in moduli. Surface treated rubber has been shown to increase the moduli of polyurethanes in other studies. The failure mode for the polyurethane control was cohesive, indicating that the material was sufficiently flexible. However, the bond strength was relatively low. Increases in treated rubber levels stiffened and strengthened the joint and once the internal strength of the adhesive surpassed the interfacial adhesive strength, the failure mode became increasingly adhesive and the strength of the joint was governed by the strength of the bond interface.

Thus, increasing the levels of surface treated rubber past 23% apparently improves the cold properties of the material. Formulations containing 30% treated rubber passed the 2° F. cold flex test while all other formulations failed. Although the adhesive failure mode of the 30% treated rubber material is undesirable, it may be possible to optimize the formula in future work to achieve cohesive failure in order to take advantage of the improved cold flex properties. The test results are shown in the Table below.

|  | Control | | Treated Rubber Particle Size | | | | | |
|  | | | 60 Mesh | | 200 Mesh | | | |
|  | PU-1a | PU-1b | PU-2 | PU-3 | PU-4 | PU-5 | PU-6 | PU-7 |
| --- | --- | --- | --- | --- | --- | --- | --- | --- |
| Wt % Polyurethane | 50 | 50 | 50 | 50 | 50 | 50 | 50 | 50 |
| Wt % CaCO3 | 50 | 50 | 37.5 | 20 | 37.5 | 32 | 27 | 20 |
| Wt % Treated Rubber | — | — | 12.5 | 30 | 12.5 | 18 | 23 | 30 |
| Vol % Polyurethane | 69.2 | 69.2 | 62.7 | 55.4 | 62.7 | 60.2 | 56.1 | 55.4 |
| Vol % CaCO3 | 30.8 | 30.8 | 20.9 | 9.9 | 20.9 | 17.1 | 14.0 | 9.9 |
| Vol % Treated Rubber | — | — | 16.4 | 34.7 | 16.4 | 22.6 | 27.9 | 34.7 |
| Shear Overlap (psi) | 232 | 247 | 225 | 340 | 250 | 328 | 327 | 338 |
| % Cohesive Failure | 100% | 100% | 100% | 35% | 100% | 98% | 50% | 0% |
| Cold Flex | | | | | | | | |
| 2F. | Fail | Fail | Fail | Pass | Fail | Fail | Fail | Pass |
| −20F. | Fail | Fail | Fail | Fail | Fail | Fail | Fail | Fail |
| Appearance (10 = best) | | | | | | | | |
| Surface | 8 | 8 | 5 | 3 | 6 | 8 | 7 | 7 |
| Gloss | 5 | 6 | 4 | 5 | 6 | 6 | 6 | 6 |
| Uniformity | 9 | 9 | 6 | 6 | 9 | 9 | 9 | 9 |

Surface-modified rubber particles is the only known reinforcing, elastomeric filler which can be readily combined with the recited polymer materials to manufacture end products that have reduced raw material costs and, in some cases, create better physical properties. This new class of materials promises to open significant new markets for the recited polymer materials by altering their performance/price ratio and making then more competitive with other materials.

For ease of understanding in defining the various groups of host polymer systems, the following definitions and groupings will be used in describing the polymer grouping with which the treated particlized rubber material is combined. Condensation polymerization can be defined as a polymerization reaction in which water, or some other simple molecule, is eliminated from two or more monomer molecules as they combine to form the polymer or cross links between polymer chains. Examples of resins so made are alkyds, phenol-formaldehyde, urea-formaldehyde polyisocyanurate, polyurethane, epoxies, polyesters, polyamides, acetals, polyphenylene oxide and other phenolics. These materials will be referred to as Condensation Polymers.

Another polymer grouping is Addition Polymers. Addition polymerization is defined as a reaction in which unsaturated monomer molecules join together to form a polymer in which the molecular formula of the repeating unit is identical (except for the double bond) with that of the monomer. The molecular weight of the polymer so formed is thus the total of the molecular weights of all of the combined monomer units.

Example:

n $CH_2=CH_2 \rightarrow (-CH_2CH_2-)_n$ with molecular weight=n×28.03

Examples of Addition Polymers are polyethylene, polypropylene and polybutadiene.

Another category of polymers are Copolymers, Terpolymers, Blends and Alloys which include ethylene-propylene-diene (EPDM), acrylonitrile-butadiene-styrene and styrene-acrylonitrile (SAM). Another grouping which can be referred to as Heteroatom Containing Polymers, has an oxygen or halogen atom as a part of the basic polymer formation. Such Heteroatom Containing Polymers due to the inclusion of an oxygen or halogen atom, significantly increase the polarity of the resulting polymer and make such polymers more suitable to the introduction of the treated particlized rubber material of this invention. Examples of Heteroatom Containing Polymers are polyvinyl chloride, polyurea, and acetal.

Another category or grouping of polymers are Latex Polymers. Latex is defined as (1) a stable emulsion of a polymer in water, mostly used in paints and coatings; and (2) the sap of the hevea (rubber) tree and other plants or emulsions prepared from the same. Latices of interest to the plastics industry are based mainly on the styrene-butadiene copolymers, polystyrene, acrylics, vinyl polymers, and other copolymers. Further examples of Latex Polymers are acrylates and styrenics.

Concrete is a composite material made of cement, aggregates, admixtures and water. Although the aggregates make up ¾ of the volume of concrete, the active constituent in concrete is cement paste and the properties and performance of concrete are largely determined by the properties of the cement paste.

According to ASTM C-150, portland cement is a hydraulic cement produced by pulverizing clinker consisting essentially of hydraulic calcium silicates, usually containing one or more of the forms of calcium sulfate as an interground addition. The major phases of portland cement are tricalcium silicate (3CaO.SiO$_2$), dicalcium silicate (2CaO.SiO$_2$), tricalcium aluminate (3CaO.Al$_2$O$_3$) and a ferrite phase of average composition (4CaO.Al$_2$O$_3$.Fe$_2$O$_3$).

The C—S—H phase (calcium-silicone-hydration) is the main binding agent in portland cement pastes. The exact structure of C—S—H is not easily determined considering the several possibilities by which the atoms and ions are bonded to each other in this phase. It is believed that the siloxane groups, water molecules, and calcium ions may contribute to bonds across surfaces or in the interlayer position of poorly crystallized C—S—H material such that the bonding substantially resembles an inorganic polymer bonding structure. Thus, concrete may be considered to be an inorganic polymer and singularly constitute a group which will be referred to as Inorganic Polymers.

Yet another category or grouping of polymers are Naturally Occurring Polymers. Naturally occurring polymers or polymer-like materials are asphalt and Gilsonite. Asphalt can be defined as a dark brown or black, bituminous, viscous material found in natural deposits and also produced as a residue of petroleum refining. Asphalt, whether found in natural beds or obtained as a residue of petroleum refining, consists chiefly of hydrocarbons which may be any of a various mixture of such hydrocarbons, e.g. tar, which occur often in combination with their non-metallic derivatives.

Gilsonite is a naturally occurring, solid carbonacious material which is classified as an asphaltite. It is a relatively pure hydrocarbon without significant amounts of mineral impurities. Both asphalt and Gilsonite are considered to be short-chain hydrocarbon based polymers which can be obtained from naturally occurring deposits or, in the case of asphalt, from heat refining of petroleum. The definitions used herein have been excerpted from *Whittington's Dictionary of Plastics*, edited by James F. Carley and published by Technomic Publishing Company.

The present invention may be embodied in other specific forms without departing from the spirit or essential attributes thereof and, accordingly, the described embodiments are to be considered in all respects as being illustrative and not restrictive, with the appended claims, rather than the foregoing detailed description, indicating the scope of the invention as well as all modifications which may fall within a range of equivalency which are also intended to be embraced therein.

We claim:

1. A composite polymer comprising a matrix polymer containing as a filler particlized rubber treated by contacting said rubber in a gas/solid phase reactor with a chlorine-containing gas at a temperature and chlorine gas partial pressure sufficient to increase the bulk chlorine content of the granulated rubber to a bulk chlorine content within the range of $2 \times 10^{-3}$ to $1.2 \times 10^{-1}$ grams per square meter of rubber particle surface area for forming an article selected from the group consisting of solid cast tires and wheels, wheels for motorized and hand-operated vehicles, drive, guide and support rollers, drive and conveyor belts, containers, construction materials, wire and cable sheathing, hosing and flexible tubing, coatings, adhesives, resilient and non-resilient foams, and bottom surfacings and pads for footwear.

2. The composite polymer of claim 1, wherein the matrix polymer is selected from the group consisting of polyurethanes, polyisocyanurates, epoxies, polyesters, acrylics, silicone polymers, polysulfides, polyamides and polycarbonates.

3. The composite polymer of claim 1, wherein the matrix polymer is selected from the group consisting of condensation polymers, addition polymers, copolymers/terpolymers/blends/alloys, heteroatom containing polymers, latex polymers, inorganic polymers and naturally occurring polymers.

4. The article formed using the composite polymer materials and process of claim 1, wherein said article is a solid cast polyurethane tire exhibiting improved dry and wet traction.

5. The article formed using the composite polymer materials and process of claim 1, wherein said article is a skate wheel exhibiting improved dry and wet traction.

6. The article formed using the composite polymer materials and process of claim 1, wherein said article is an industrial vehicle tire exhibiting improved dry and wet traction.

7. The article formed using the composite polymer materials and process of claim 1, wherein said article is a drive and guide roller for a transporting apparatus exhibiting improved frictional contact.

8. The article formed using the composite polymer materials and process of claim 1, wherein said article is a guide and support roller for materials handling machinery exhibiting improved frictional contact.

9. The article formed using the composite polymer materials and process of claim 1, wherein said article is a conveyor belt exhibiting improved dry and wet frictional contact.

10. The article formed using the composite polymer materials and process of claim 1, wherein said article is a drive belt exhibiting improved dry and wet frictional contact.

11. The article formed using the composite polymer materials and process of claim 1, wherein said article is a microcellular polyurethane tire to be placed on a hub for use with wheelchairs, bicycles, carts and wheelbarrows exhibiting improved dry and wet traction.

12. The article formed using the composite polymer materials and process of claim 1, wherein said article is footwear sole material exhibiting improved dry and wet frictional contact.

13. The article formed using the composite polymer and process of claim 1, wherein said matrix polymer is a cast polyurethane, and wherein said article is footwear sole material exhibiting improved dry and wet frictional contact.

14. The article formed using the composite polymer and process of claim 1, wherein said matrix polymer is a thermoplastic elastomer, and wherein said article is footwear sole material exhibiting improved tear resistance.

15. The article formed using the composite polymer and process of claim 1, wherein said matrix polymer is a nitrile rubber, and wherein said article is footwear sole material exhibiting improved dry and wet frictional contact.

16. The article formed using the composite polymer and process of claim 1, wherein said article is a coating exhibiting improved dry and wet traction and wherein said matrix polymer is comprised of one or more of the composite materials of the group consisting of polysulfides, epoxies, acrylics and polyurethanes.

17. The article formed using the composite polymer of claim 16, wherein said coating is comprised of an epoxy polymer, said coating exhibiting improved impact resistance.

18. The article formed using the composite polymer of claim 16, wherein said coating is comprised of a polyurethane, said coating exhibiting improved tear resistance.

19. The article formed using the composite polymer and process of claim 1, wherein said article is an industrial container or enclosure coating exhibiting improved impact resistance and wherein said matrix polymer is comprised of one or more of the composite materials of the group consisting of polyurethanes, polysulfides and epoxies.

20. The article formed using the composite polymer and process of claim 1, wherein said article is an adhesive exhibiting improved lapshear strength and wherein said matrix polymer is selected from the composite materials of the group consisting of epoxies and polyurethanes.

21. The adhesive of claim 20, wherein said adhesive is comprised of an epoxy composite polymer, said adhesive further comprising particles of extremely small rubber domains, said adhesive exhibiting improved lapshear strength and fracture toughness.

22. The article formed using the composite polymer and process of claim 1, wherein said article is a foam exhibiting improved tensile strength and tear resistance for use as underlay support and cushioning for carpeting, upholstery, and packaging and for use as a sound absorber.

23. The article formed using the composite polymer and process of claim 1, wherein said article is a semi-rigid foam exhibiting improved tensile strength and tear resistance and wherein said semi-rigid foam is comprised of a matrix polymer selected from the group consisting of polyisocyanurates, phenolics and polyurethanes.

24. The article formed using the composite polymer and process of claim 1, wherein said matrix polymer is a thermoplastic elastomer, and wherein said article is wire and cable sheathing material exhibiting improved tear resistance.

25. The article formed using the composite polymer and process of claim 1, wherein said matrix polymer is a thermoplastic elastomer, and wherein said article is hosing and flexible tubing material exhibiting improved tear resistance.

* * * * *